United States Patent [19]

Emura et al.

[11] Patent Number: 5,223,333
[45] Date of Patent: Jun. 29, 1993

[54] COMPOSITE MATERIAL FOR ENHANCING TRACTION

[75] Inventors: Akira Emura; Shuichi Harada; Kazuya Emura, all of Tokyo, Japan

[73] Assignee: Yachiyo Micro Science Company Limited, Tokyo, Japan

[21] Appl. No.: 483,075

[22] Filed: Feb. 21, 1990

[51] Int. Cl.⁵ .............................. B32B 7/02
[52] U.S. Cl. ........................ 428/217; 428/323; 428/325; 428/329; 428/331; 428/403; 428/404; 428/407
[58] Field of Search .......... 428/492, 325, 329, 331, 428/403, 407, 404, 217, 323, 402.24; 524/525, 526

[56] References Cited

U.S. PATENT DOCUMENTS 3,607,607  9/1971  Beninga ........................... 428/49
3,958,063  5/1976  Robson ............................ 428/329

Primary Examiner—Paul J. Thibodeau
Assistant Examiner—Hoa T. Le
Attorney, Agent, or Firm—Merchant, Gould, Smith, Edell, Welter & Schmidt

[57] ABSTRACT

A composite material for enhancing traction between a surface of an article made of the material and a second contact surface is disclosed. Fine chips are encapsulated in covering material to form covered particles. The covered particles are evenly dispersed within a base material. The covering material is harder than the base material; the second contact surface material is harder than the covering material; and the fine chips are made from a material that is harder than the second contact surface material. As the surface of the article made of the material and the second contact surface interact, the fine chips are continuously exposed to the second contact surface. As a result, the fine chips are free to engage small indentations in the second contact surface and to bite into ice on the second contact surface, if any ice is present.

20 Claims, 1 Drawing Sheet

COMPOSITE MATERIAL FOR ENHANCING TRACTION

BACKGROUND OF THE INVENTION

1. Field of the Invention

This invention relates to a composite material for enhancing traction, and, more particularly, to encapsulating very hard fine chips within a hard covering material and dispersing the resulting covered particles within a relatively soft base material.

2. Description of the Art

Friction plays an important role in various aspects of life. For example, frictional forces between tires and a road surface are the means by which automobiles start and stop. Generally, a road surface is irregular on a magnified level, so that slight protrusions on a tire interact with slight indentations in the road surface, and slight indentations in a tire interact with slight protrusions on the road surface; the result is satisfactory traction between the tire and the road surface. Although ice also has an irregular surface on a magnified level, the pressure exerted on the ice by the tires causes the surface of the ice to melt and re-freeze in such a manner that the ice becomes smooth. When a road surface becomes icy, or otherwise slippery, the traction between the tires and the road surface, by definition, decreases. As a result, it becomes more difficult to start and stop the automobile, as well as change directions.

Various attempts have been made to enhance tire traction under slippery driving conditions. For example, it was once common to drive metal spikes partially into tires or to wrap metal chains around tires. The portions of the spikes or chains that protruded from the tire bit into the ice and provided satisfactory traction. However, the use of such spikes or chains damaged the road and generated harmful dust, and as a result, their use has been discouraged.

Another example involves the use of special rubber that remains relatively pliable in cold temperatures, so that tires made of such rubber are less likely to smooth over an icy surface. Additionally, special tread patterns may be applied to tires to enhance their traction capabilities. Such improvements do not damage the road nor generate dust, but they only minimally enhance traction as compared to the spikes or chains. Thus, it is desirable to have material for enhancing the traction between tires and road surfaces without any adverse side effects, and, generally, to have material for enhancing traction between various contact surfaces.

SUMMARY OF THE INVENTION

The present invention provides a composite material for enhancing traction between a surface of an article made of the material and a second contact surface. According to one aspect of the invention, the composite material comprises: (a) a base material, wherein said base material is not as hard as the second contact surface, whereby contact between said base material and the second contact surface does not significantly damage the second contact surface; and (b) covered particles dispersed within said base material, wherein said covered particles include fine chips encapsulated within a covering material, wherein said fine chips are harder than the second contact surface, wherein the second contact surface is harder than said covering material, and wherein said covering material is harder than said base material, whereby contact between the second contact surface and said covered particles exposes said fine chips, but contact between said base material and said covered particles does not expose said fine chips, and whereby when the composite material interacts with the second contact surface, said covered particles and said fine chips engage the second contact surface and enhance traction between the surface of the article made of the material and the second contact surface.

While the invention will be described with respect to a preferred embodiment, which is described in terms of automobile tires and road surfaces, it will be understood that the invention is not limited to such preferred embodiment, nor the environment in which it is described. The general principles of the invention apply to all types of contact surfaces requiring enhanced traction, such as the soles of shoes and floor coverings. Additional variations of the invention will become apparent to those skilled in the art upon a more detailed description of the invention.

DESCRIPTION OF THE PREFERRED EMBODIMENT

Figure 1:
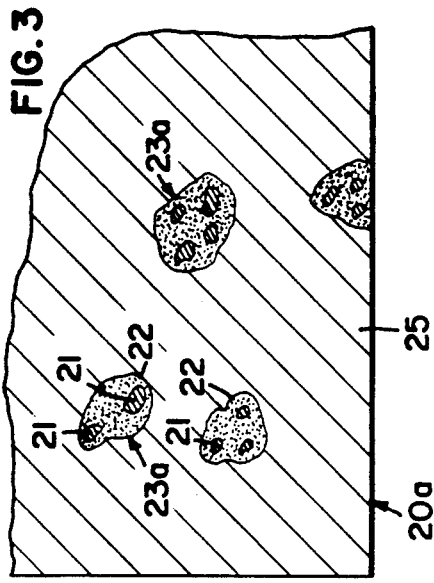
FIG. 1 is a partial sectional view of a preferred embodiment of a composite material for enhancing traction.

Referring to the Figures, wherein like numerals represent like parts throughout the several views, FIG. 1 shows a preferred embodiment of a composite material for enhancing traction. The composite material 20 includes a base material 25 and covered particles 23, kneaded and evenly dispersed within the base material 25. The ratio by volume of the base material 25 to the covered particles 23 is approximately between 9:1 and 7:3. Each covered particle 23 includes a fine chip 21 encapsulated in a covering material 22.

Figure 3:
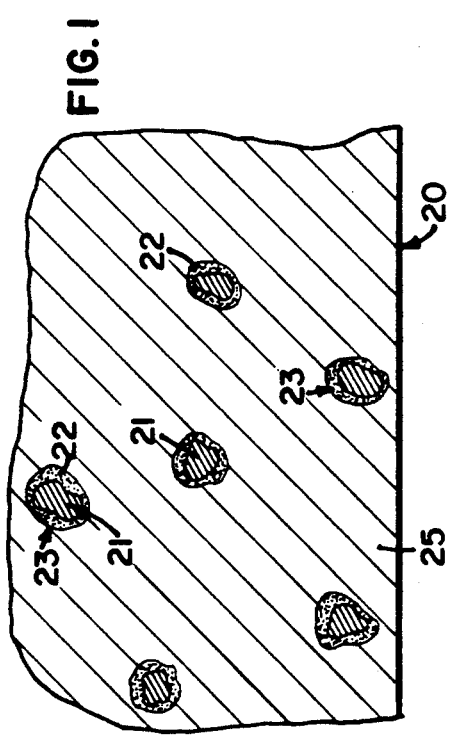
FIG. 3 is a partial sectional view of an alternative embodiment for a composite material for enhancing traction.
Figure 4:
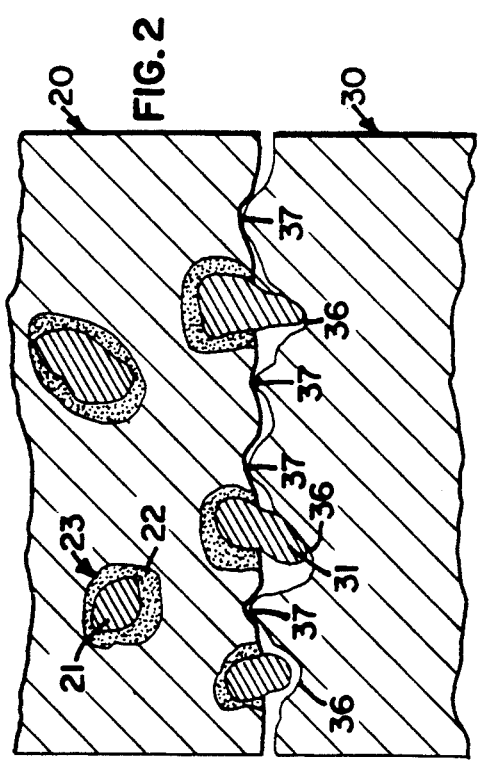
FIG. 4 is a partial sectional view of another alternative embodiment for a composite material for enhancing traction.
Figure 2:
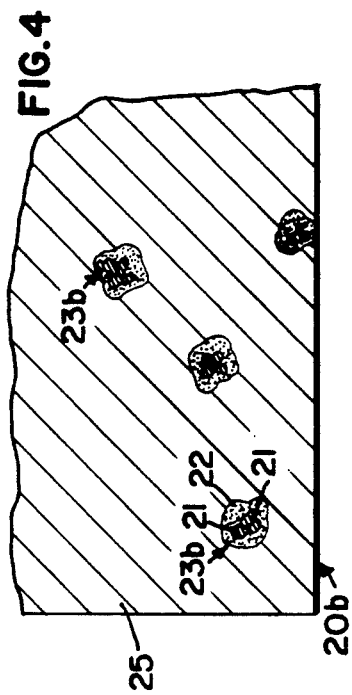
FIG. 2 is a magnified partial sectional view of the preferred embodiment shown in FIG. 1, in relation to a second contact surface.

Referring to FIGS. 3 and 4, which show alternative embodiments, the covered particles 23a and 23b contain multiple chips isolated and clustered, respectively, within the covering material 22. Referring to FIG. 2, the composite material 20 is magnified and shown in relation to an equally magnified portion of a second contact surface 30.

The base material 25 has a hardness less than that of the covering material 22, the second contact surface 30, and the fine chips 21. Acceptable materials for the base material 25 include synthetic resins, such as urethane resin, epoxy resin, and polyethylene, as well as natural rubber and synthetic rubber.

The fine chips 21 are made from a material with a hardness greater than that of the second contact surface 30, the covering material 22, and the base material 25. Acceptable materials for the fine chips 21 include silicon carbide, aluminum oxide, garnet ore, carbite alloy, etc. The fine chips 21 are approximately between 30 and 100 microns in diameter and are preferably irregularly shaped to maximize their gripping propensity. Prior to encapsulation, the fine chips 21 may be treated to improve adhesion with the covering material 22.

The covering material 22 has a hardness greater than that of the base material 25 but less than that of the second contact surface 30 and the fine chips 21. Acceptable materials for the covering material 22 include phenolic resin, epoxy resin, bridge-polyethylene, polyamide resin, etc. Additionally, the covering material 22 may include multiple layers, and different materials may be used for different layers. The covering material is approximately between 5 and 20 microns in thickness. The covering material 22 facilitates binding of the fine chips 21 and the base material 25 and serves as a buffer between the fine chips 21 and the base material 25, so that the fine chips 21 will not significantly bite into the base material 25.

The interaction of the various elements made from materials of varying hardnesses will be explained with reference to a tire made from the composite material 20 and to a road surface serving as the second contact surface 30. Referring to FIG. 2, as the composite material 20 wears away through contact with the road surface 30, the covered particles 23 are exposed to the road surface 30. The covering material 22 is caught between a fine particle 21 and the road surface 30, both of which have a hardness greater than that of the covering material 22. As a result, the covering material 22 wears away relatively quickly, and the fine chip 21 is exposed to the road surface 30 and free to engage small indentations 36 therein or to bite into ice (not shown) on the road surface 30. The fine chips are small enough that they do not significantly damage the road surface. Contemporaneously, small protrusions 37 in the road surface 30 impact upon the relatively soft and pliable base material 25, further enhancing traction. Thus, traction is enhanced as the fine chips 21, which are made from a material harder than that of the road surface 30, bite into the road surface 30 and/or into ice on the road surface 30, and the base material 25, which is made from a material less hard than that of the road surface 30, deforms to receive protrusions 37 in the road surface 30.

Through continual wear, the covered particles 23 are successively exposed to the road surface 30 and dislodged from the base material 25. However, since the covered particles 23 are evenly dispersed throughout the base material 25, covered particles 23 are continuously exposed to the road surface 30. As a result, the composite material 20 provides the enhanced traction associated with metal spikes and/or metal chains, but without significant damage to the road surface and/or generation of harmful dust.

While a specific embodiment of the invention has been disclosed, is to be understood that such disclosure has been merely for the purpose of illustration and that the invention is not to limited in any manner thereby. For example, the composite material for enhancing traction may be used with contact surfaces other than tires, such as the soles of shoes and floor coverings. Various other modifications of the invention will be apparent to those skilled in the art in view of the foregoing example. The scope of the invention is to be limited only by the appended claims.

What is claimed is:

1. A composite material, comprising:
   (a) synthetic resin or rubber a base material; and
   (b) a plurality of encapsulated particles dispersed throughout and bonded with said base material, wherein each of said encapsulated particles comprises at least one inorganic chip encapsulated within and bonded to an encapsulating material, said encapsulating material comprising a synthetic resin, wherein said chips are harder than said encapsulating material, and wherein said encapsulating material is harder than said base material, whereby contact between a harder surface external to the composite material and said encapsulated particles exposes said chips, but contact between said base material and said encapsulated particles does not expose said chips.

2. The composite material as claimed in claim 1, wherein said chips are greater than 30 microns in diameter and less than 100 microns in diameter.

3. The composite material as claimed in claim 2, wherein said encapsulating material is greater than 5 microns thick and less than 20 microns thick.

4. The composite material as claimed in claim 1, wherein said encapsulating material is selected from the group consisting of phenolic resin, epoxy resin, bridge-polyethylene, and polyamide resin.

5. The composite material as claimed in claim 4, wherein said encapsulating material is selected from the group consisting of urethane resin, epoxy resin, polyethylene, natural rubber, and synthetic rubber, and wherein said chips are selected from the group consisting of silicon carbide, aluminum oxide, garnet ore, and carbide alloy.

6. The composite material as claimed in claim 1, wherein said encapsulating particles includes a single one of said chips.

7. The composite material as claimed in claim 6, wherein said encapsulating particles include a plurality of layers of encapsulating material.

8. The composite material as claimed in claim 7, wherein each of said layer sis a different material.

9. The composite material as claimed in claim 1, wherein the ratio by volume of said base material to said encapsulated particles is greater than 7:3.

10. The composite material as claimed in claim 9, wherein said ratio is less than 9:1.

11. A tire, comprising:
    (a) a rubber base material; and
    (b) a plurality of encapsulated particles dispersed throughout and bonded with said base material, wherein each of said encapsulated particles comprises at least one inorganic chip encapsulated within and bonded to an encapsulating material, said encapsulating material comprising a synthetic resin, wherein said hips are harder than said encapsulating material, and wherein said encapsulating material is harder than said base material whereby contact between a harder road surface external to the tire and said encapsulated particles exposes said chips, but contact between said base material and said encapsulated particles does no expose said chips.

12. A tire as claimed in claim 11, wherein said chips are greater than 30 microns in diameter and less than 100 microns in diameter.

13. A tire as claimed in claim 12, wherein said encapsulating material is greater than 5 microns thick and less than 20 microns thick.

14. The tire as claimed in claim 11, wherein said encapsulating material is selected from the group consisting of phenolic resin, epoxy resin, bridge-polyethylene, and polyamide resin.

15. The tire as claimed in claim 14, wherein said base material is selected from the group consisting of natural rubber and synthetic rubber, and wherein said chips are selected from the group consisting of silicon carbide, aluminum oxide, garnet ore, and carbide alloy.

16. The tire as claimed in claim 11, wherein each of said encapsulated particles includes a single one of said chips.

17. The tire as claimed in claim 16, wherein said encapsulated particles include a plurality of layers of encapsulating material.

18. The tire as claimed in claim 17, wherein each of said layers is a different material.

19. The tire as claimed in claim 11, wherein the ratio by volume of said base material to said encapsulated particles is greater than 7:3.

20. The tire claimed in claim 19, wherein said ratio is less than 9:1.

* * * * *

UNITED STATES PATENT AND TRADEMARK OFFICE
CERTIFICATE OF CORRECTION

PATENT NO. : 5,223,333
DATED : June 29, 1993
INVENTOR(S) : Akira Emura et al.

It is certified that error appears in the above-identified patent and that said Letters Patent is hereby corrected as shown below:

On column 4, line 51 (claim 11), please delete "hips" and substitute therefore --chips--

On column 4, line 57 (claim 11), please delete "no" and substitute therefore --not--

On column 4, line 23 (claim 5), please delete "encapsulating" and substitute therefore --base--

On column 4, line 31 (claim 6), please delete "said encapsulating" and substitute therefore --each of said encapsulated--

On column 4, line 34 (claim 7), please delete "encapsulating" and substitute therefore --encapsulated--

On column 4, line 37 (claim 8), please delete "layer sis" and substitute therefore --layers is--

On column 5, line 3 (claim 15), please delete "," after the word "rubber"

Signed and Sealed this

Fourteenth Day of February, 1995

Attest:

BRUCE LEHMAN

*Attesting Officer*  *Commissioner of Patents and Trademarks*